United States Patent [19]

Brewer

[11] 4,051,671
[45] Oct. 4, 1977

[54] JET ENGINE WITH COMPRESSOR DRIVEN BY A RAM AIR TURBINE

[76] Inventor: John A. Brewer, 2120 Kensington Blvd., Fort Wayne, Ind. 46805

[21] Appl. No.: 620,846

[22] Filed: Oct. 8, 1975

Related U.S. Application Data

[63] Continuation-in-part of Ser. No. 519,527, Oct. 31, 1974, abandoned.

[51] Int. Cl.² ............................................. F02K 3/00
[52] U.S. Cl. ..................................... 60/262; 60/269; 60/39.72 R
[58] Field of Search .................. 60/269, 262, 39.18 C, 60/39.72 R, 39.65, 270 R; 417/174

[56] References Cited

U.S. PATENT DOCUMENTS

| 904,276 | 11/1908 | Prache | 417/174 |
|---|---|---|---|
| 2,405,919 | 8/1946 | Whittle | 60/39.18 C |
| 2,974,478 | 3/1961 | Sweet et al. | 60/269 |
| 2,987,873 | 6/1961 | Fox | 60/262 |
| 3,055,178 | 9/1962 | Phillips | 60/39.72 R |
| 3,154,516 | 10/1964 | Seifferlein | 60/39.72 R |
| 3,352,110 | 11/1967 | Cresswell | 60/262 |
| 3,371,618 | 3/1968 | Chambers | 417/174 |
| 3,719,428 | 3/1973 | Dettmering | 60/39.18 C |

FOREIGN PATENT DOCUMENTS

| 63,081 | 7/1913 | Austria | 60/269 |
|---|---|---|---|
| 1,161,189 | 3/1958 | France | 60/262 |
| 848,912 | 9/1960 | United Kingdom | 60/262 |

OTHER PUBLICATIONS

Cohen et al., "Gas Turbine Theory," Longmans, Green & Co., London, 1951; pp. 218-238.

LeFebvre, A. H., "Advanced Gas Turbine Combustion Chambers," Pergamon Press, Oxford, 1967; pp. 3-15.

Primary Examiner—Carlton R. Croyle
Assistant Examiner—Robert E. Garrett
Attorney, Agent, or Firm—Gust, Irish, Jeffers & Rickert

[57] ABSTRACT

A jet engine having outer and inner tubular casings with an annular fluid passage therebetween, a combination motor fan and compressor mechanism having fluid driven vanes and compressing vanes which are used to compress the incoming fluid charge to an engine burner located in the inner casing; each of the casings defining at their outflow ends a nozzle orifice; the fluid driven vanes being part of a motor fan and radially overlying the compressor vanes and having an average mean diameter greater than that of the compressor vanes. The compressor vanes discharge fluid under pressure into the burner area of the inner tubular casing while the fluid driven vanes communicate with the annular space between the inner and the outer tubular casings. Apertures are provided in the inner tubular casing downstream of the burner in that area where the burning and expansion of gasses is taking place; air is drawn through these apertures from the annular passage into the combustion chamber by Venturi effect to increase the velocity of air through the fluid driven vanes. Also, due to the axial spacing between the inner casing and outer casing nozzles, the flow of air in the annular passage is further increased. The ratio of the mean diameter of the fluid driven vanes to the compressor vanes and the ratio of the total aperture area plus an area defined between the nozzles of the inner and outer casings combine to increase the boost ratio of the jet engine thereby increasing its efficiency.

8 Claims, 3 Drawing Figures

JET ENGINE WITH COMPRESSOR DRIVEN BY A RAM AIR TURBINE

BACKGROUND OF THE INVENTION

Field of the Invention

This is a continuation-in-part application of application Ser. No. 519,527, filed Oct. 31, 1974, now abandoned.

Jet engines conventionally have turbine driven compressors which compress the fluid being introduced to the burner to increase engine efficiency. The burner ignites the compressed fluid and fuel which is introduced in the burner area and burning of the fuel fluid mixture takes place in a chamber aft or downstream of the burner. The tremendous expansion of the gases in the burning chamber are exhausted through an exhaust nozzle, or nozzles, at a greatly increased fluid velocity over the incoming air. This invention uses no turbine to drive the compressor.

SUMMARY OF THE INVENTION

This invention provides a jet engine of increased efficiency. A tubular outer casing houses rotatably mounted motor fan and compressor mechanism having fluid driven vanes which drive, on the same shaft, fluid compressor vanes which compress incoming fluid to a burner section. The burner section is enclosed by an inner tubular casing which has aft or downstream of the burner, a combustion or expansion chamber which terminates in a nozzle orifice. The outer tubular casing also has an exhaust nozzle which is larger than, and spaced downstream by a predetermined amount from, the expansion chamber nozzle. An annular passage is provided between the outer tubular casing and the inner tubular casing and the fluid driven vanes discharge into this annular passage which surrounds the inner casing and the expansion chamber.

The expansion chamber area is provided with a plurality of perforations or apertures so that the expanding gases in this chamber cause a high velocity fluid exhaust through the expansion chamber nozzle drawing air from the annular passage through the apertures in the process. This causes increased flow in the annular passage driving the vanes of the motor fan with more force. Also, the expansion chamber nozzle is spaced upstream and is smaller than the outer casing and exhaust nozzle. Due to the area between the two nozzles, gasses emitted from the combustion or expansion chamber nozzle will, by Venturi action, draw additional fluid through the annular passage out the exhaust nozzle, further increasing the fluid flow in the annular passage and further driving the fluid vanes at a higher rotational speed. Increased torque is applied to the fluid driven vanes of the motor fan in a ratio that is related to the total area of all of the apertures in the expansion chamber plus the area of the imaginary cylinder which connects the two nozzles divided by the cross-sectional area of the inner tubular casing at the burner section.

This invention further enhances the driving torque applied to the fluid driven vanes of the motor fan by providing an advantageous ratio between the mean diameter of the fluid driven vanes and the mean diameter of the compressor vanes. This ratio is obtained by having the fluid driven vanes overlying and spaced radially from the fluid compressing vanes. By combining this ratio with the aforementioned area ratios, a jet engine of improved efficiency is obtained.

The present invention relates to a jet engine and more particularly to a jet engine having an air compressor driven by air flow to a motor fan produced by the burning of fuel when the engine is stationary and by the addition of ram air when the engine is in motion.

An object of this invention is to provide a jet engine provided with an axial flow compressor driven by an inflow of air produced by the consumption of air by the fuel burner and forward motion of the engine.

It is another object of this invention to provide a jet engine having an air driven, axial flow compressor which includes a motor fan disposed radially outwardly from the compressor, which provides the driving force therefor.

It is still another object of this invention to provide a jet engine having an axial flow compressor driven by a motor fan that is operated by differential air pressure produced by Venturi effect derived from the jet flow of exhausted gasses.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

Referring to FIG. 1 of the drawings, one embodiment of this invention is shown in diagrammatic form. The jet engine includes a tubular outer casing 10 having an inner coaxially positioned tubular casing 12 composed essentially of four different sections, the first section 14 being frustoconically shaped, a second section 16 cylindrically shaped, a third section 18 frustoconically shaped and a fourth section 20 cylindrically shaped as shown. The tail portion 22 of the section 20 is frustoconically shaped terminating in the reduced diameter exhaust nozzle 24. The casing 10 has a tail section 26 frustoconically shaped as shown which terminates distally beyond the exhaust nozzle 24 to provide a secondary exhaust nozzle 28 of larger diameter than the primary nozzle 24. The two casings 10 and 12 are spaced apart as shown to provide an annular duct 30. The inner casing 12 is rigidly secured to the outer casing 10 by means of a series of radial struts 32. The inner casing 12 is also provided with a multiplicity of apertures 34 in the section 20 uniformly extending around the entire circumference thereof and for the entire length with the exception of the tail section 22.

Figure 1:
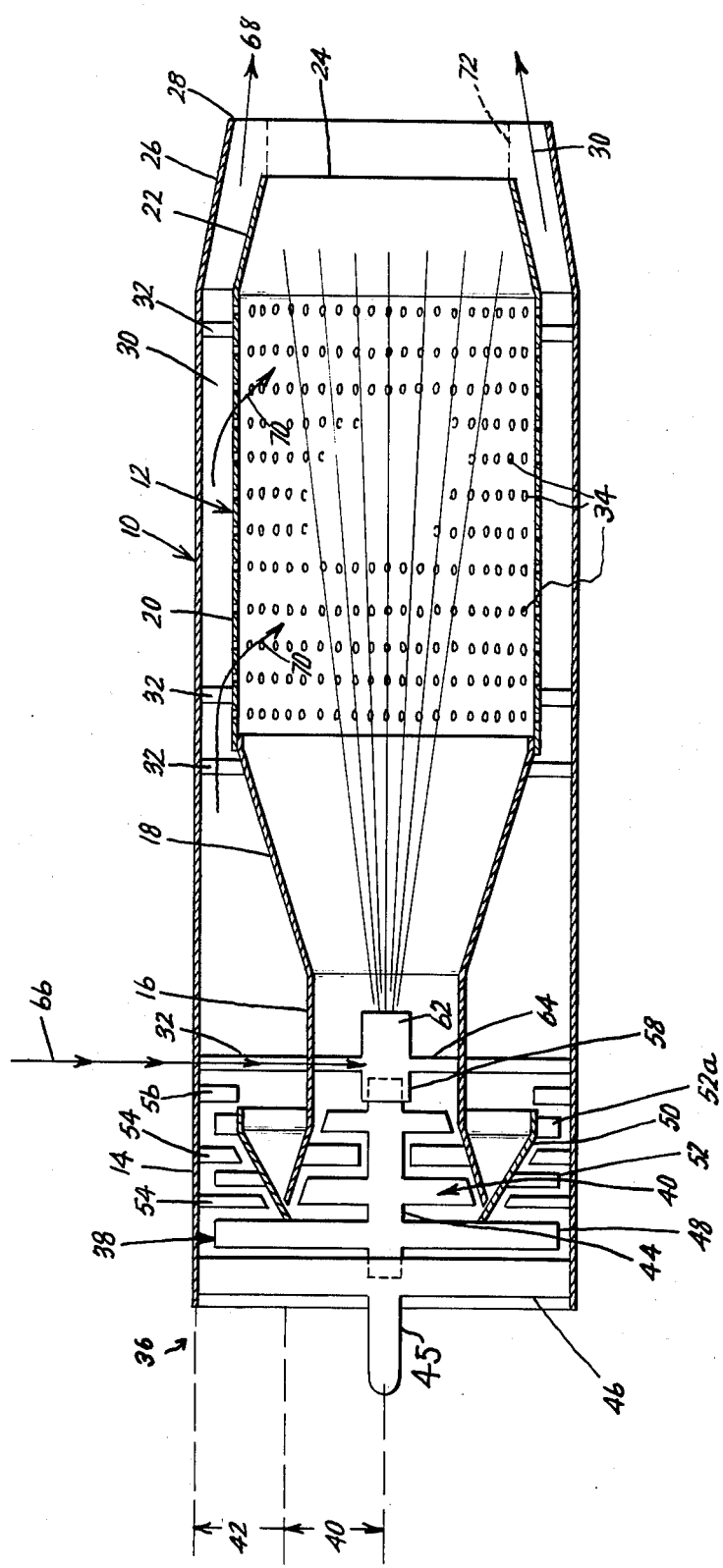
FIG. 1 is a longitudinal sectional view of one embodiment of this invention.

In the forward open end 36 of the jet engine is mounted an air driven, axial-flow combination fan and compressor mechanism generally denoted by the numeral 38 which is divided into two radial sections, an inner radial section (axial flow compressor) 40 and an outer radial section (motor fan) 42, these two sections 40 and 42 being separated by means of the frustoconical section 14 of the inner casing 12. The mechanism 38 includes a central shaft 44 journaled at its front end in a stationary bearing support 45 carried by suitable, circumferentially spaced radial struts 46 secured to the outer casing 10 as shown, the struts 46 being sufficiently thin and spaced such that the front end 36 of the engine is substantially open to inflow of air. On the shaft 44 is secured a first rotor vane or blade section or stage 48 of a diameter corresponding to the inner diameter of the casing 10 as shown. To this blade section 48 is secured a coaxially disposed frustoconical, blade support 50 to which other stages of radially outwardly extending conventionally shaped rotor vanes or blades 52, 52a are secured. Suitable conventional stator blades 54 also secured to the casing 10 are disposed between the rotor blades 52, 52a in a conventional manner, suitable straightening blades 56 also secured to the casing 10 being disposed on the aft side of the rotor section 42 as in conventional compressor designs. It should be noted that the frustoconical, blade support 50 has its aft end disposed radially adjacent to the casing 10 such that the aft rotor blades 52a are much shorter than the other rotor blades 52. The reason for this difference in dimension will be explained later. The inner radial section 40 of the compressor is also composed of rotor and stator vanes or blades of conventional design as shown with the aft end of the rotor shaft 44 being journaled in a suitable bearing 58 supported from the inner casing section 16 by means of suitable, circumferentially spaced radial struts 32. The blades in the motor fan 42 are of lesser pitch that the blades of the compressor 40 for reasons that will become apparent from the description that follows.

A conventional burner or injector nozzle 62 is mounted on the engine axis inside casing section 16 by means of the struts 64 secured to the inner casing section 16, and has connected thereto a fuel line, diagrammatically shown at 66.

For start up from stationary condition, if desired, the motor fan 42 may be rotated to a suitable speed by means of a starter motor in accordance with conventional practices to provide a rearward flow of air, or in the alternative, the engine may be operated as a ramjet to provide such flow.

Explaining the operation on the engine thus far described, fuel at a suitable pressure, of, for example, about 60 psi, is injected into the burner 62 by conventional means and is caused to ignite. Burning of this fuel within the casing 12 results in a jet flow of gasses rearwardly through the nozzles 24 and 28 producing a differential pressure over the compressor mechanism 38. Air is thus drawn through the compressor mechanism 38 impacting the rotor blades 52, 52a aiding in their rotation. Exhaust gasses emanating from the nozzle 24 by Venturi effect produces an outflow of air from the annular duct 30 as well as the inflow of air through apertures 34 into the casing section 20 as indicated by the arrows 70. This results in a sharp reduction in pressure in the annular duct 30 between casings 10 and 12 which in turn produces an increased pressure differential over the outer fan section 42. This results in increased inflow of air through fan section 42 which more forcefully drives the rotor blades 52, 52a. Thus, the fan section 42 may be termed a motor fan inasmuch as it provides rotational driving force for the inner radial section or axial flow compressor 40 of the mechanism 38.

By reason of the increased rotational force, hence rotational speed, imparted to the compressor section 40, more air is fed to the burner 62 thereby augmenting combustion. This in turn produces a higher velocity jet flow from the nozzle 24, causing still further a reduction in the pressure in the annular duct 30. This further reduction in pressure produces more forceful driving of the motor fan 42 and axial compressor 40, this cycle continuing until the engine reaches its full operational capacity for the amount of fuel being injected to the burner 62.

By reason of the fan blades 52a being disposed immediately adjacent to the casing 10, and the solid-wall, rotor support 50 serving as an annular, passage-narrowing constriction for the blades 52a, the velocity of air flowing through the annular constriction occupied by the blades 52a will be a maximum which serves in providing a mechanical advantage by reason of the radial moment arm extending from blades 52a to the shaft 44 axis in developing rotational force by the motor fan 42. The differential pressure prevailing over the motor fan 42 is utilized to the maximum in providing an augmented driving force for the axial compressor 40. Thus, the motor fan 42 provides the power for rotating the axial compressor 40.

The axial air flow from compressor section 40, by reason of the absence of straightening, will follow a swirling path to maximize the velocity thereof through casing 12, while that from the section 42 will be substantially straight by reason of the presence of the straighteners 56.

A mechanical advantage or boost in the driving power applied to the compressor 40 is determined by the mean radius of the compressor 40 blades, the area of the casing section or throat 16, the mean radius of the blades 52a, the total area of the apertures 34 and the area of the imaginary cylinder indicated by the dashed line 72 which extends between the planes of the nozzles 24 and 28 with a diameter equal to the nozzle 24.

Figure 2:
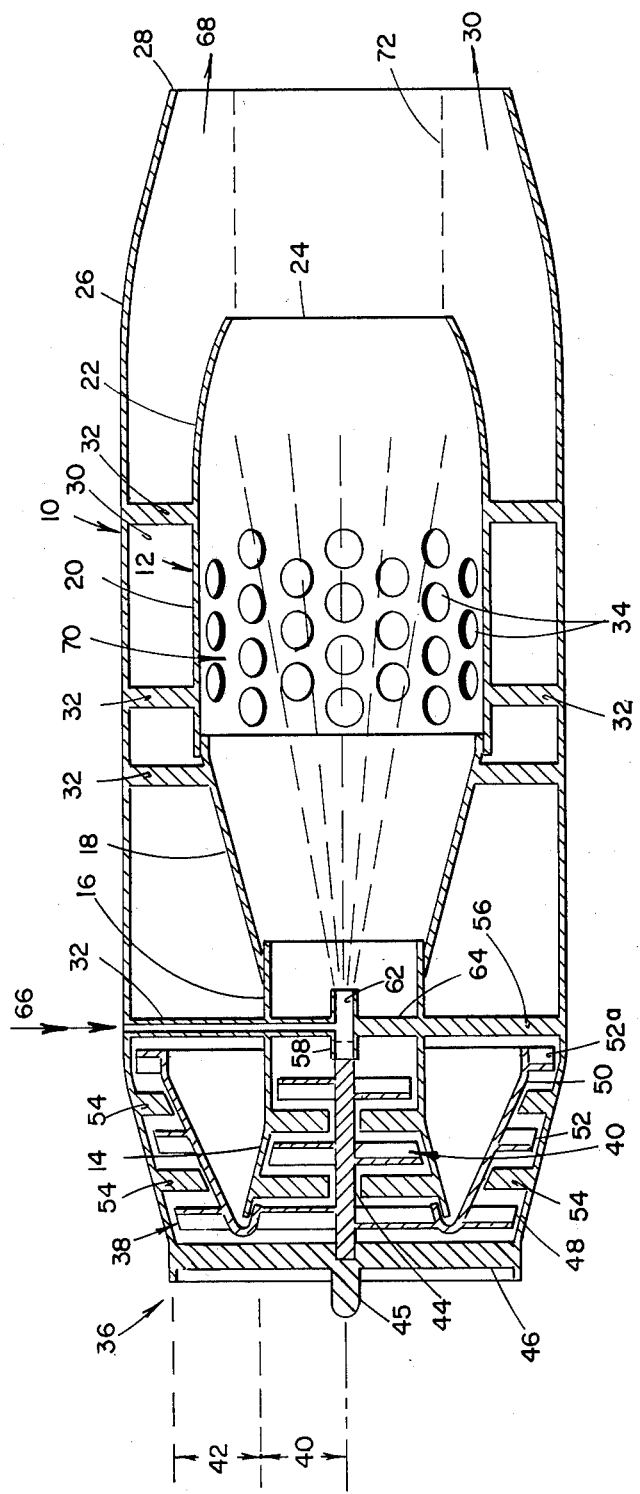
FIG. 2 is a like view of a slightly different embodiment drawn substantially to scale.

FIG. 2 illustrates an embodiment dimensionally more to scale, of the invention more diagramatically shown in FIG. 1. Like numerals indicate like parts.

The approximate mechanical advantage achieved can be calculated according to the following, referring to FIG. 2.

Assume the average static (engine stationary) pressure across blades 52a when combusion is present in chamber ducts 16, 18 is 4 pounds per square inch. Then the engine boost will approximate the following formula using the monenclature:

| | |
|---|---|
| Average pressure drop | $Pd = 4$ lbs/in$^2$ |
| Mean radius of blades 52a | $R_{52a}$ |
| Sum of the areas of apertures 34 | $A_{34}$ |
| Area of cylinder 72 | $A_{72}$ |
| Mean radius of compressor 40 | $R_{40}$ |
| Cross-sectional area of duct 16 | $A_{16}$ |
| $\dfrac{Pd \cdot R_{52a} \cdot A_{34} \cdot A_{72}}{R_{40} \cdot A_{16}}$ = Boost, assuming | |

$A_{34}$ to be equal to $A_{72}$.

As the engine moves, the pressure drop Pd will increase according to engine velocity and combustion from nozzle 62.

Further, assuming that the area ($A_{52a}$) of the space occupied by blades 52a is twice that of the compresser duct 16 ($A_{16}$), a typical approximate calculation may be made as follows, using values as indicated:

| | | |
|---|---|---|
| $A_{16}$ | = | 28.28 in$^2$ with inner radius ($R_{16}$) of duct 16 being 3 inches |
| $A_{52a}$ | = | 56.56 in$^2$ |
| $R_{52a}$ | = | 8.75 in |
| I.D.$_{10}$ | = | 9.00 in (inner radius of casing 10) |

-continued $A_{72}$ = 63.62 in
$A_{34}$ = 63.62 in
$R_{40}$ = 2.0 in
$L_{72}$ = 4.5 in (length of cylinder 72)
$R_{72}$ = 2.25 in (radius of cylinder 72)
$I.D._{12}$ = 6.00 in · inner radius of casing 12

Then using the above formula $$\frac{(4)(8.75)(63.62)(63.62)}{(2.0)(28.28)} = \frac{141,662}{56.56} = 2504 \text{ pounds boost}$$

By altering these diameters and areas, a different boost ratio may be obtained as desired.

The Venturi effect which produces the airflows 68 and 70 furthermore creates a layer of cooling air encompassing the jet of hot gasses from burner 62 emitted from the nozzle 24. This not only maintains the tail section 22 cool but also the casing 12 itself.

Figure 3:
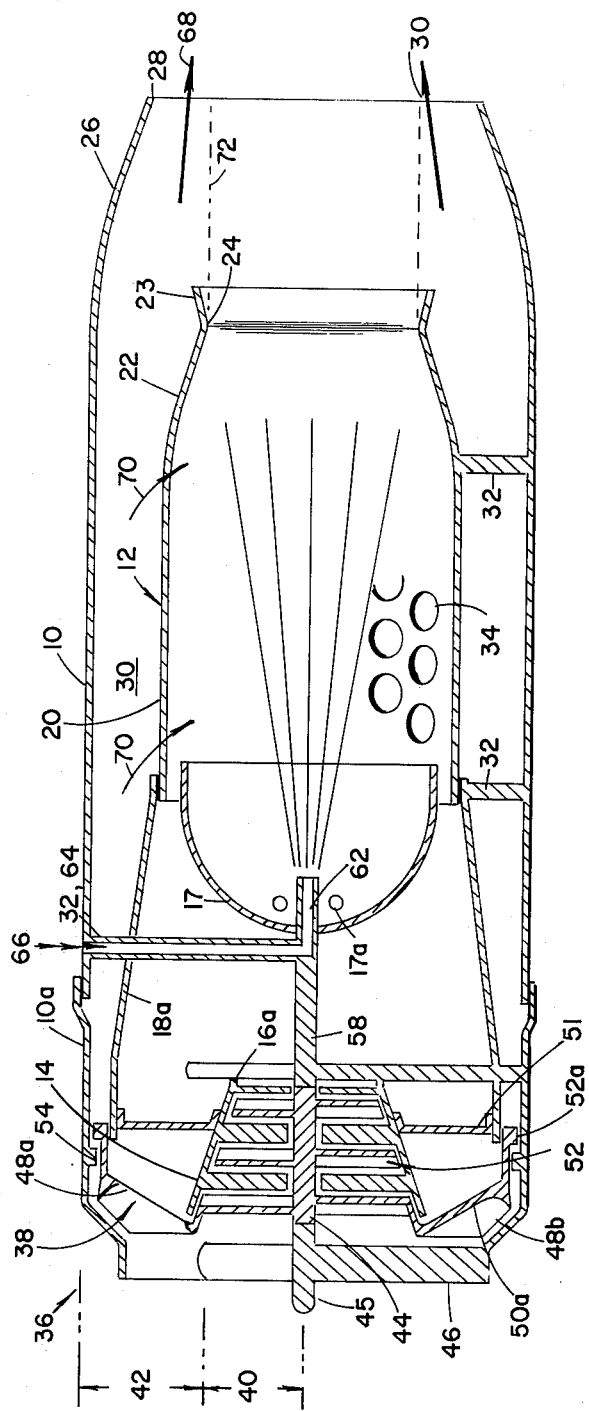
FIG. 3 is a like sectional view of still another embodiment also drawn substantially to scale.

FIG. 3 illustrates still another working embodiment of this invention wherein like numerals indicate like parts and like numerals with the suffix letter "a" indicates parts that are functionally the same as the part denoted by the corresponding reference number. In particular, the inner casing 12 at the exhaust end 24 has an outwardly flared flange 23 as shown. Surrounding the fuel nozzle 62 is a hemispherical shell 17 fixedly secured in position on nozzle 62 and radially spaced as shown from the casing 12. The frustoconical portion 18a, secured to casing 12, instead of tapering inwardly as the portion 18 in FIGS. 1 and 2, tapers outwardly, viewing the drawings from right toward the left. The throat portion 16a is of shorter length than the corresponding portion 16 in the preceeding FIGS. 1 and 2 and serves as the exhaust end of the compressor 40. The front end 36 of the engine is tapered radially inwardly and shaped as shown. The casing 10 is formed of two parts 10 and 10a secured together by means of stepped flanges. A solid partition 51 is secured between the portion 18a and the outer housing 14 of compressor 40. The primary rotor 48a replaces the rotor 48 of FIGS. 1 and 2 and includes a frusto-conical support 50a like support 50 of FIGS. 1 and 2 but less tapered. Fan blades 48b are secured to support 50a in circumferentially spaced relation.

In some instances, the design of FIG. 3 is preferred inasmuch as the compressor air which flows around the hemispherical shell 17 provides turbulance for more effective burning of the fuel emitted from the nozzle 62. If desired, a number of apertures 17a may be provided in the shell 72 to receive a certain amount of air therethrough for supporting combustion. The principle of operation of this embodiment of FIG. 3 is the same as for the preceeding figures.

The embodiments of FIGS. 2 and 3 are drawn substantially to scale.

While use of the frusto-conical supports 50 and 50a are shown, the supports may be radially disc-shaped; however, the conical configuration is preferred since inflow of air is more readily deflected outwardly into the annular duct 30 via the blades 52, 52a.

While the present invention is directed more particularly to a turbine-less jet engine, a fuel-powered turbine can nevertheless be incorporated therein by disposing it aft of the burner 62 and connecting the shaft thereof to the compressor shaft 44. However, in the embodiments disclosed by locating the inner nozzle 24 forward of the outer nozzle 28 to obtain enhanced flow in passage 30 due to the Venturi effect, and by providing the inlet air passage to the fan blades 52, 52a that narrows fore to aft, an efficient engine is realized without use of such a turbine: hence this invention may be characterized as being turbine-less.

While there have been described above the principles of this invention in connection with specific apparatus, it is to be clearly understood that this description is made only by way of example and not as a limitation to the scope of the invention.

What is claimed is:
1. In a jet engine comprising:
 a. an elongated annular outer casing having a central longitudinal axis, a substantially open forward end and a substantially open, rear nozzle end,
 b. an elongated annular inner casing coaxially disposed within said outer casing and having a substantially open forward end and a substantially, rear nozzle end,
  1. said inner casing forward end being smaller than said outer casing forward end and forming a first air intake for said inner casing;
 c. said outer casing being radially spaced from and defining an elongated annular air passage with said inner casing which extends between said ends thereof,
  1. said inner casing forward end forming with said outer casing a second, annular air intake for said air passage,
  2. said outer casing nozzle end being larger than and spaced rearwardly from said inner casing nozzle end whereby combustion gasses exhausted from said inner casing nozzle end cause rearward air flow in said air passage by Venturi action;
 d. a fan and compressor assembly rotatable about said axis and having radially inner compressor vanes connected to radially outer motor fan vanes, and rotated thereby,
  1. at least one group of said fan vanes being disposed in said second air intake whereby said air flow in said air passage causes rotation of said fan and compressor vanes,
  2. at least one group of said compressor vanes being disposed in said first air intake whereby rotation of said compressor vanes forces air under pressure rearwardly through said inner casing; and
 e. means for burning fuel disposed in said inner casing rearwardly of said compressor vanes;
the improvement wherein:
 i. said inner casing has a first section which converges rearwardly from said first air intake to a rear end smaller than said first air intake;
 ii. said inner casing has a second section with a forward end connected to said first section, said second section extending rearwardly from said first section to a rear end which is no larger than said forward end,
  1. said fuel burning means being disposed in said second section;
 iii. said inner casing has a rear section with a forward end connected to said second section, said rear section extending rearwardly from said second section to said nozzle end thereof
 iv. said fan and compressor assembly includes an annular wall rotatable therewith and which diverges rearwardly in said annular passage from said second air intake to define a rearwardly converging air intake duct with said outer casing,
1. all of said fan vanes being connected to said wall and extending radially outwardly therefrom,
2. said one group of compressor vanes having a connection with said wall and extending radially inwardly therefrom.

2. The engine of claim 1 wherein:
v. there are a plurality of groups of said fan vanes spaced rearwardly along said wall;
vi. and further comprising a group of stationary vanes connected to said outer casing and extending radially inwardly between each adjacent pair of groups of fan vanes.

3. The engine of claim 1 wherein:
v. said fan and compressor assembly includes a rotatable shaft;
vi. there are a plurality of groups of said compressor vanes connected to said shaft, spaced rearwardly therealong, and extending radially outwardly therefrom,
1. the forwardmost group of said compressor vanes being said one group and being connected to said wall;
vii. and further comprising a group of stationary vanes connected to said first section of said inner casing and extending radially inwardly between each adjacent pair of groups of compressor vanes.

4. The engine of claim 3 wherein:
ii. said second section of said inner casing is cylindrical, has substantially the same diameter as said rear end of said first section, and is connected thereto.

5. The engine of claim 4 wherein:
viii. said forward end of said rear section of said inner casing is connected to said rear end of said second section by a third section which diverges rearwardly from said rear end of said second section to said forward end of said rear section.

6. The engine of claim 3 wherein:
viii. said rear section of said inner casing has a generally cylindrical forward portion and a rearward portion which converges rearwardly to said nozzle end.

7. The engine of claim 6 wherein:
ix. said forward portion of said rear section of said inner casing has a plurality of apertures therein communicating with said air passage whereby said combustion gases exhausted from said inner casing nozzle end cause inward air flow from said annular passage through said apertures by Venturi action thereby increasing the velocity of air flow in said air passage.

8. The engine of claim 7 wherein:
x. said forward end of said second section of said inner casing is larger than said first air intake and is connected to said first section by an imperforate wall, said second section converging rearwardly to said rear end thereof;
xi. said forward end of said rear section has substantially the same diameter as said rear end of said second section and is directly joined thereto.

* * * * *

UNITED STATES PATENT AND TRADEMARK OFFICE
CERTIFICATE OF CORRECTION

PATENT NO. : 4,051,671
DATED : October 4, 1977
INVENTOR(S) : John A. Brewer

It is certified that error appears in the above-identified patent and that said Letters Patent are hereby corrected as shown below:

Column 4, line 54, change "$R_{40} : A_{16}$" to --$R_{40} \cdot A_{16}$--

Claim 4, column 8, line 1, "ii" should be --ii(3)--

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*